(12) United States Patent
Shobu

(10) Patent No.: US 6,399,994 B2
(45) Date of Patent: Jun. 4, 2002

(54) SEMICONDUCTOR DEVICE FOR SURFACE-SHAPE RECOGNITION

(75) Inventor: Satoshi Shobu, Nagasaki (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/767,407

(22) Filed: Jan. 23, 2001

(30) Foreign Application Priority Data

Jan. 24, 2000 (JP) ........................................ 2000-017967

(51) Int. Cl.[7] .......................... H01L 27/14; H01L 29/82; H01L 29/84; H01L 31/115
(52) U.S. Cl. ......................... 257/414; 257/417; 257/416; 257/429
(58) Field of Search ................................. 257/414, 417, 257/416, 429

(56) References Cited

U.S. PATENT DOCUMENTS 5,962,810 A * 10/1999 Glenn
6,011,273 A * 1/2000 Ichikawa et al.
6,180,989 B1 * 1/2001 Bryant et al.
6,310,371 B1 * 10/2001 Hung

* cited by examiner

Primary Examiner—Stephen D. Meier
(74) Attorney, Agent, or Firm—Sonnenschein, Nath & Rosenthal

(57) ABSTRACT

A semiconductor device for surface-shape recognition capable of preventing a destruction of a device due to a discharge of static electricity and an occurrence of cracks at a shape recognition surface when being pressed by an object such as a finger and improving reliability, including a plurality of sensor pad electrodes formed on a substrate and storing charges, a plurality of semiconductor elements formed at a lower portion of the sensor pad electrode and reading charges stored in the sensor pad electrodes, a first protective film formed while covering the sensor pad electrodes and clearances between the sensor pad electrodes, a groove formed in the surface of the first protective film in regions between the sensor pad electrodes, a neutralization electrode impressed with a fixed potential formed in the groove so that a height becomes substantially the same as the depth of the groove, and a second protective film formed while covering the first protective film and the neutralization electrode.

16 Claims, 14 Drawing Sheets

SEMICONDUCTOR DEVICE FOR SURFACE-SHAPE RECOGNITION

BACKGROUND OF THE INVENTION

1. Field of the Invention

The present invention relates to a semiconductor device for surface-shape recognition, more particularly relates to an electrostatic capacity type semiconductor device for surface-shape recognition for sensing fine topology of human fingerprints etc.

2. Description of the Related Art

Due to the growth of the information society, interest has risen in security in modern society. For example, in an information society, personal authentication has become an important key in constructing electronic cashing and other systems. Further, much research activity is going on regarding authentication as a defensive measure against theft and illicit use of credit cards.

Accordingly, much technology has been disclosed regarding surface shape recognition as represented by fingerprint sensors.

Here, the methods of detection in fingerprint and other shape recognition includes the optical detection method and the electrostatic capacity detection method.

The electrostatic capacity detection method is a method for detecting the value of the electrostatic capacity (hereinafter also simply referred to as a capacity value) between an electrode of a shape recognition sensor and for example a finger. The electrostatic capacity type is advantageous for mounting in a portable terminal etc. since it enables easy reduction of the size of the device, so there is active work being conducted on development of electrostatic capacity type sensors.

Here, an explanation will be made of a semiconductor device for surface-shape recognition according to the related art. Specifically, an explanation will be made of one for sensing the fine topology of human fingerprints etc.

FIG. 1 is a sectional view of an electrostatic capacity type semiconductor device for surface-shape recognition.

A gate electrode 30 forming a word line is formed above a channel formation region of a semiconductor substrate 10 via a not illustrated gate insulating film. Further, source and drain diffusion layers 11 are formed in the semiconductor substrate 10 at the two side portions of the gate electrode 30. Thus, a transistor Tr is formed. One of the source and drain diffusion layers 11 of the transistor Tr is connected to a not illustrated bit lines.

An inter-layer insulating film 20 made of for example silicon oxide is formed covering the transistor Tr. Sensor pad electrodes 31 each formed by a laminate of a barrier metal layer made of for example Ti and an aluminum layer etc. are formed at an upper layer thereof while arranged in a matrix. A sensor pad electrode 31 is formed connected to the other source or drain diffusion layer 11 of the transistor Tr formed in a lower layer thereof by a not illustrated contact etc.

A first protective film 21 of an insulator made of for example a silicon nitride is formed over the entire surface while covering the sensor pad electrodes 31 and clearances between the sensor pad electrodes 31. A neutralization electrode 32a fixed to a certain potential and made of for example Ti is formed at an upper layer of the first protective film 21. A second protective film 22 of an insulator made of for example silicon nitride is formed over the entire surface while covering the first protective film 21 and the neutralization electrode 32a. Here, the surface of the second protective film 22 at the upper portion of the neutralization electrode 32a forms a convex shape M.

As described above, a semiconductor device for surface-shape recognition using a region wherein the sensor pad electrodes 31 are arranged in a matrix as a shape recognition surface is formed.

Next, an explanation will be made of the operation of a semiconductor device for surface-shape recognition.

As shown in FIG. 2A, when for example a human finger 7 touches the shape recognition surface of the semiconductor device for surface-shape recognition, capacitors are formed from the sensor pad electrodes 31, the first protective film 21 and the second protective film 22, and the finger 7. The first protective film 21 and the second protective film 22 act as part of the capacitor insulating film. In the above description, the distances d between the sensor pad electrodes 31 and the finger 7 (for example d1, d2, ...) fluctuate in accordance with the topology 70 of the fingerprint. Accordingly, there arises a difference in the capacitances of the capacitors formed by the sensor pad electrodes 31 arranged above the shape recognition surface in the matrix. Therefore, it has become possible to recognize the shape of a fingerprint etc. by reading and detecting charges stored in the sensor pad electrodes 31 by a semiconductor element such as a transistor formed on the substrate 10.

Here, each sensor pad electrode 31 forms a unit cell of the shape recognition surface of the semiconductor device for surface-shape recognition.

The capacitors configured by the sensor pad electrodes 31 have distances d equal to ∞ in all unit cells of the shape recognition surface of the semiconductor device for surface-shape recognition in a state where the finger 7 or the like does not touch the 10 shape recognition surface. Accordingly, the electrostatic capacity value $C_s$ becomes equal 0 in all unit cells.

On the other hand, in a state where the finger 7 or the like touches the shape recognition surface, as shown in FIG. 2B, in an n-th unit cell, capacitors of the electrostatic capacity value $C_{Sn}$ are formed from the sensor pad electrode 31, the first protective film 21 and the second protective film 22, and the finger 7. The electrostatic capacity value $C_{Sn}$ is represented by:

$$C_{Sn} = \epsilon \cdot \epsilon_0 \cdot S / d_n$$

Here, S is the area contributing to the capacitor of each electrode, $d_n$ is a distance between the electrode of the n-th unit cell and the finger (for example $d_1, d_2, \ldots$), and n is the number of each unit cell (n=1, 2, 3, ...).

As the configuration for reading the electrostatic capacity value $C_{Sn}$ in the unit cells, there is employed a configuration wherein the capacitors formed from the sensor pad electrode 31 of each unit cell, the first protective film 21 and the second protective film 22, and the finger 7 are connected to one source or drain diffusion layer 11 of the transistor using for example a word line WL ($WL_1, WL_2, \ldots$) as the gate electrode, the other source or drain diffusion layer 11 is connected to a bit line BL ($BL_1, BL_2, \ldots$), and further a capacitor of a electrostatic capacity value $C_B$ is connected to the bit line BL.

In the above configuration, by the touch of the finger in a state where $V_{CC}$ is applied to the bit line BL ($V_{CC}$ precharge), a potential change of the bit line BL represented by:

$$\Delta V_n = [C_{Sn}/(C_B + C_{Sn})] \cdot V_{CC}$$

occurs. By detecting this potential change ΔVn in each cell, the electrostatic capacity value $C_{Sn}$ for every unit cell is calculated and image processing is performed to recognize the shape of the object.

Here, for example the human body etc. is generally sometimes charged. Therefore, in the conventional semiconductor device for surface-shape recognition, as shown in FIG. 2A, in order to prevent damage of the semiconductor device for surface-shape recognition due to discharge of static electricity to the shape recognition surface when the charged human puts his finger close to the shape recognition surface of the semiconductor device for surface-shape recognition, the neutralization electrode 32a fixed at for example the ground potential is provided near the surface of the shape recognition surface.

However, since the neutralization electrode 32a is formed at a predetermined position above the first protective film 21 made of for example silicon nitride, while the second protective film 22 made of for example silicon nitride is formed while covering the entire surfaces of the neutralization electrode 32a and the first protective film 21, and the shape recognition surface forms a convex shape M accordingly, in the base portion of the convex shape M, there is insufficient mechanical strength, so there was the problem that, as shown in FIG. 3, a crack C was formed from the second protective film 22 of the shape recognition surface when pressed by a finger or the like, and the semiconductor device for surface-shape recognition was damaged.

In order to solve such a problem, the mechanical strength may be raised by flattening the surface of the shape recognition surface. As one of the processes for increasing the flatness of the surface, there is chemical mechanical polishing (CMP). In CMP, however, a new CMP system becomes necessary. Further, there is also a process using etch back such as in the following explanation. Below, an explanation will be made of the process of using etch back as another process for increasing the flatness of the surface by referring to the drawings.

First, as shown in FIG. 4A, a resist film R1 of a pattern opening the convex shape M of the second protective film 22 is formed on the second protective film 22 by photolithography.

Next, as shown in FIG. 4B, a resist is coated over the entire surface while covering the convex shape M of the second protective film 22 and the resist film R1 and thereby to form a resist film R2.

Next, as shown in FIG. 5A, by for example dry etching, the resist film R1 and the resist film R2 are etched back at the entire surface to expose the convex shape M of the second protective film 22.

Next, as shown in FIG. 5B, by using etching such as reactive ion etching (RIE), the resist film R1 and the second protective film 22 are etched back at the entire surface under conditions of substantially equivalent etching rates and part of the convex shape M of the second protective film 22 is eliminated to make the step of the convex shape M small. After the etching, a convex shape m having a small step remains. Then, the remaining resist film R1 is eliminated.

Next, as shown in FIG. 6A, a third protective film 23 is formed on the entire surface while covering the second protective film 22 by for example chemical vapor deposition (CVD). At this time, the convex shape m is formed at the surface of the third protective film 23.

Next, as shown in FIG. 6B, a SOG (Spin on Glass) film 24 is formed by coating SOG over the entire surface while covering the third protective film 23.

Next, as shown in FIG. 7A, by for example RIE, the SOG film 24 is etched back at the entire surface to expose the top surface of the convex shape m of the third protective film 23.

At this time, there is almost no step between the surface of the third protective film 23 and the surface of the SOG film 24, so the surface becomes flat.

Next, as shown in FIG. 7B, silicon nitride is deposited on the entire surface while covering the third protective film 23 and the SOG film 24 by for example CVD to form a fourth protective film 25.

Even by the method using etch back, flattening of the shape recognition surface can be achieved, but the number of the steps is remarkably increased by the above method.

SUMMARY OF THE INVENTION

An object of the present invention is to provide a semiconductor device for surface-shape recognition capable of improving reliability by preventing a destruction of the device due to a discharge of static electricity and an occurrence of cracks in the shape recognition surface at the time of pressing by an object such as a finger.

According to a first aspect of the present invention, there is provided a semiconductor device for surface-shape recognition comprising a first transistor formed on a substrate; a first electrode formed on the first transistor; a first protective film formed on the first electrode; and a second electrode formed on the first protective film; the second electrode being formed in a groove formed in the first protective film.

Preferably, the thickness of the second electrode is substantially the same as the depth of the groove.

Preferably, the device further comprises a second protective film formed on the second electrode. More preferably, the first protective film and the second protective film are made of different materials.

Preferably, the second electrode is fixed to a certain potential.

Preferably, the first electrode is arranged in a matrix.

Preferably, the first transistor is a field effect transistor and the source or drain of the transistor is connected to the first electrode.

According to the semiconductor device for surface-shape recognition of the present invention, the charge stored in the first electrode can be read by the transistor. For example, due to the configuration of the other source or drain region connected to the bit line, if an object such as a finger touches the second protective film or the like in the state where a predetermined voltage is applied to the bit line, the potential of the bit line changes. By detecting the potential change of the bit line, the electrostatic capacity value of each capacitor can be read. Therefore, the surface shape of the object can be recognized. At this time, since a second electrode impressed with the fixed potential is formed, even if static electricity is discharged when pressing the object, swift neutralization is carried out by the second electrode, thus electrostatic destruction can be prevented.

Further, the surface as the shape recognition surface can be flattened, the mechanical strength is improved, and the occurrence of cracks at the shape recognition surface at the time of pressing by an object can be prevented.

As described above, the improvement of the reliability has become possible.

According to a second aspect of the present invention, there is provided a semiconductor device for surface-shape recognition comprising first and second transistors formed on a substrate; first and second electrodes formed on the first and second transistors; a first protective film formed on the first and second electrodes; and a third electrode formed on the first protective film; the third electrode being formed in a groove formed in the first protective film.

Preferably, the thickness of the third electrode is substantially the same as the depth of the groove.

Preferably, the device further comprises a second protective film formed on the third electrode. More preferably, the first protective film and the second protective film are made of different materials.

Preferably, the third electrode is fixed to a certain potential.

Preferably, the first and second electrodes are field effect transistors, the source or drain of the first transistor is connected to the first electrode, and the source or drain of the second transistor is connected to the second electrode. More preferably, the terminals which are not connected to the first and second electrodes of the first and second transistors are connected to capacitors.

BRIEF DESCRIPTION OF THE DRAWINGS

These and other objects and features of the present invention will become clearer from the following description of the preferred embodiments given with reference to the attached drawings, wherein:

FIGS. 4A and 4B show a one means for achieving flattening of a shape recognition surface for solving the problem of the semiconductor device for surface-shape recognition according to the related art, wherein FIG. 4A shows the state up to the step of formation of a resist film of a pattern opening a convex shape of a second protective film, and FIG. 4B shows the state up to the step of formation of a resist film covering a convex shape portion of the second protective film;

FIGS. 5A and 5B show steps continuing from FIG. 4B, wherein FIG. 5A shows the state up to the step of partial removal of the resist film, while FIG. 5B shows the state up to the step of partial removal of the convex shape portion of the second protective film surface;

FIGS. 6A and 6B show steps continuing from FIG. 5B, wherein FIG. 6A shows the state up to the step of formation of a third protective film, while FIG. 6B shows the state up to the step of formation of an SOG film;

FIGS. 7A and 7B show steps continuing from FIG. 6B, wherein FIG. 7A shows the state up to the step of partial removal of the SOG film, while FIG. 7B shows the state up to the step of formation of a fourth protective film;

FIGS. 10A and 10B are sectional views of steps of a process for production of a semiconductor device for surface-shape recognition according to an embodiment of the present invention, wherein FIG. 10A shows the state up to the step of formation of sensor pad electrodes, while FIG. 10B shows the state up to the step of formation of a first protective film;

FIGS. 12A and 12B show steps continuing from FIG. 10B, wherein FIG. 12A shows the state up to the step of formation of a resist film of a pattern for forming a groove, while

FIGS. 12A and 12B show steps continuing from FIG. 11B, wherein FIG. 12A shows the state up to the step of removal of a resist film of a pattern for forming a groove, while FIG. 12B shows the state up to the step of formation of a neutralization electrode use layer;

FIGS. 13A and 13B show steps continuing from FIG. 12B, wherein FIG. 13A shows the state up to the step of formation of a resist film of a pattern for forming a neutralization electrode, while FIG. 13B shows the state up to a step of patterning the neutralization electrode.

DESCRIPTION OF THE PREFERRED EMBODIMENTS

Figure 1:
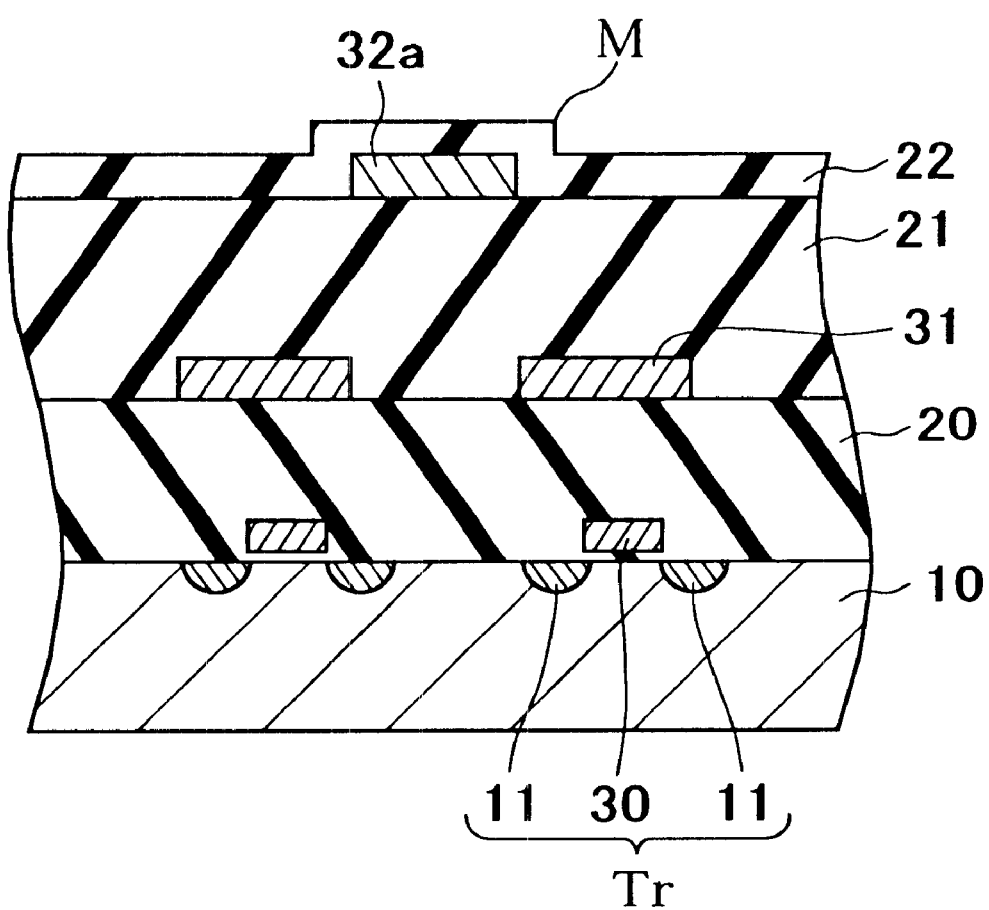
FIG. 1 is a sectional view of a semiconductor device for surface-shape recognition according to the related art.
Figure 2A:
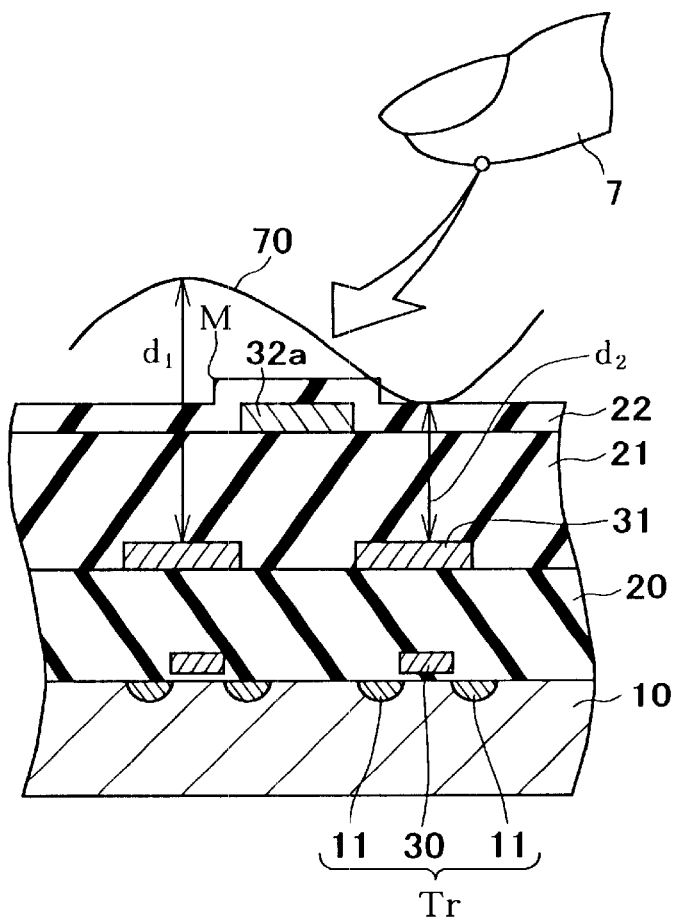
FIG. 2A is a sectional view for explaining an operation for recognizing the surface shape of an object in the semiconductor device for surface-shape recognition according to the related art.
Figure 2B:
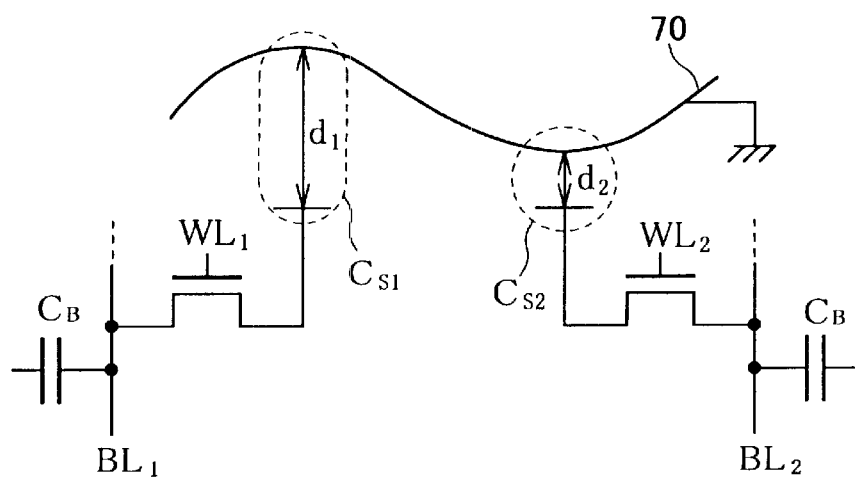
FIG. 2B is a circuit diagram of the semiconductor device for surface-shape recognition according to the related art.
Figure 3:
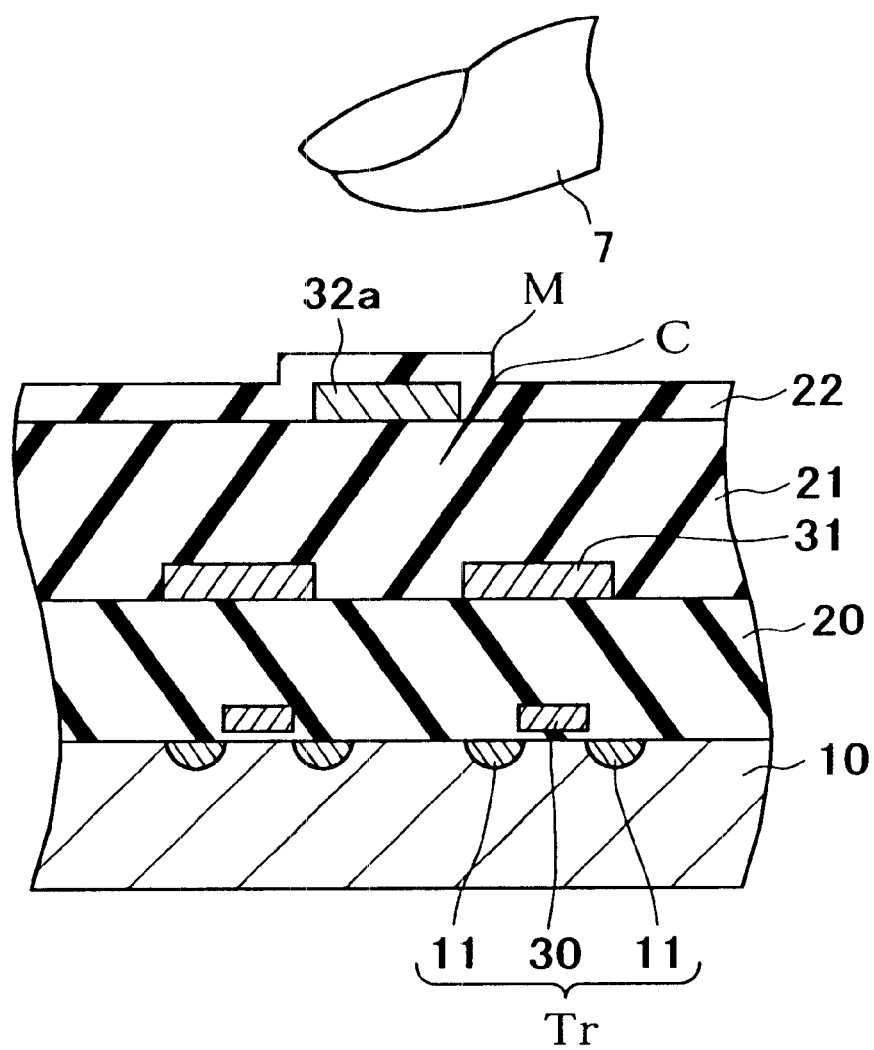
FIG. 3 is a schematic view for explaining a problem of the semiconductor device for surface-shape recognition according to the related art.
Figure 4A:
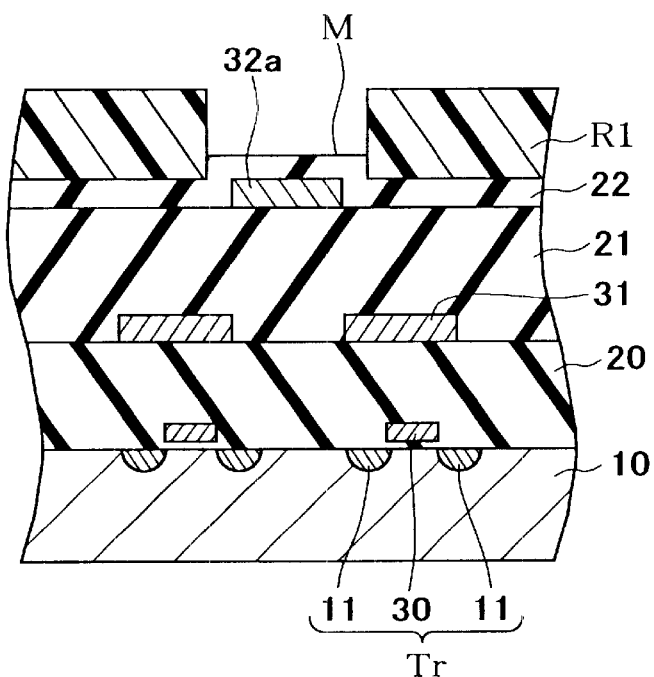
Figure 4B:
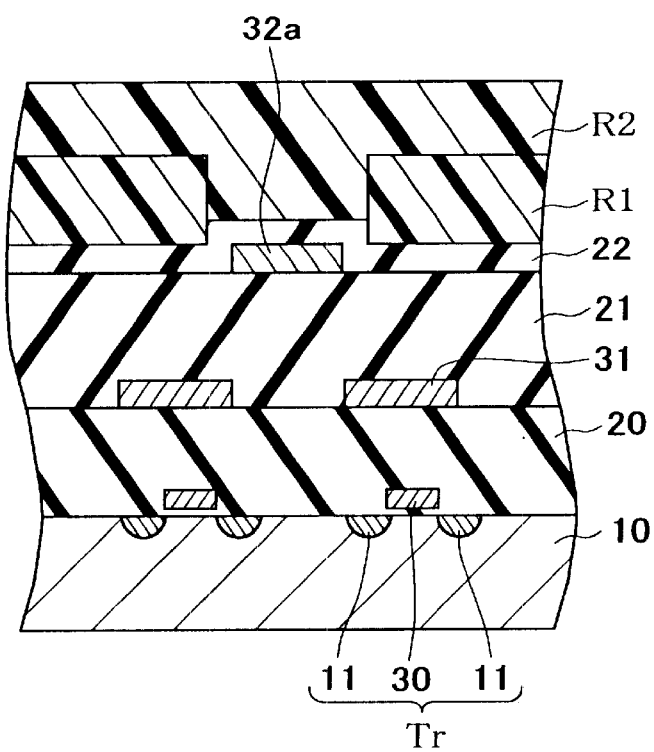
Figure 5A:
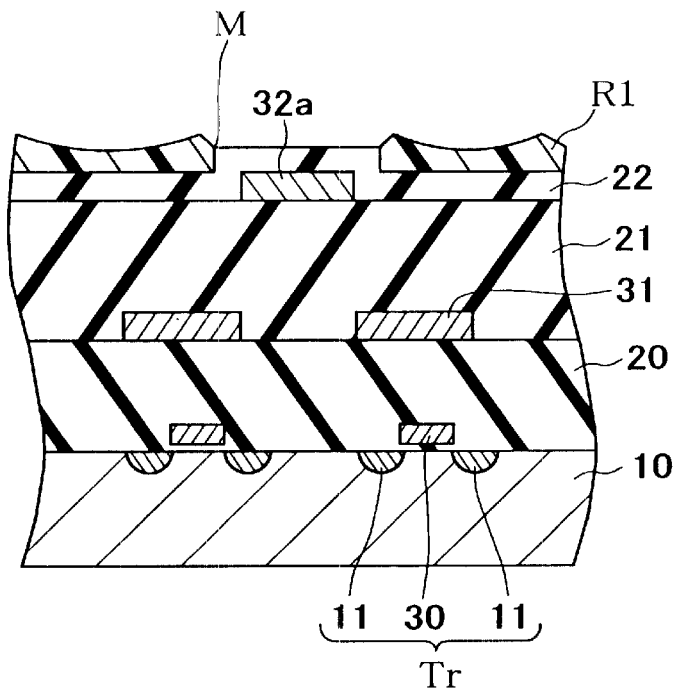
Figure 5B:
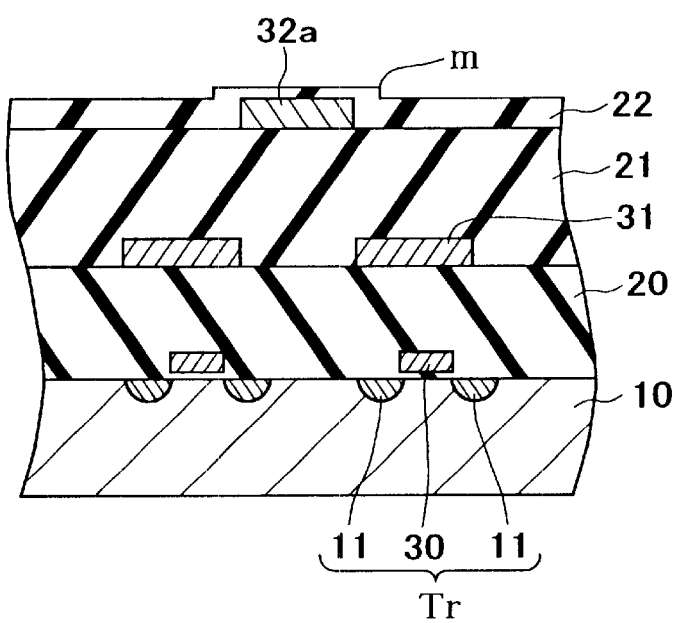
Figure 6A:
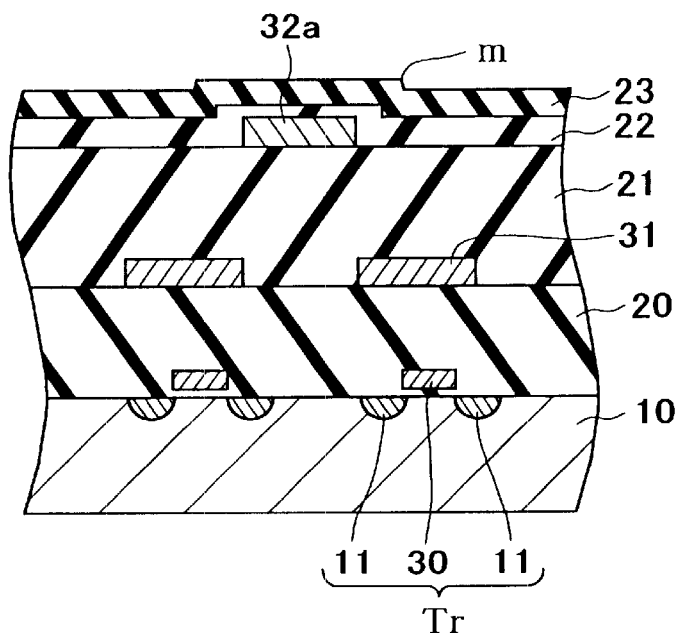
Figure 6B:
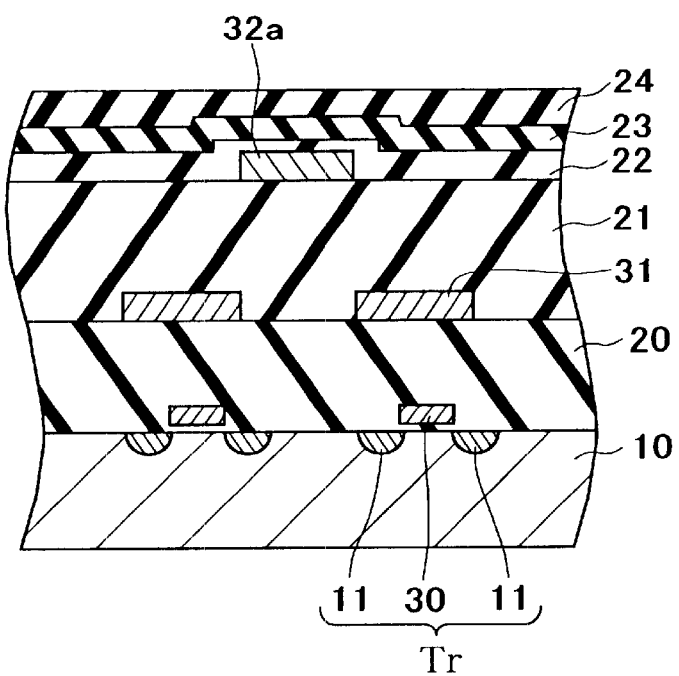
Figure 7A:
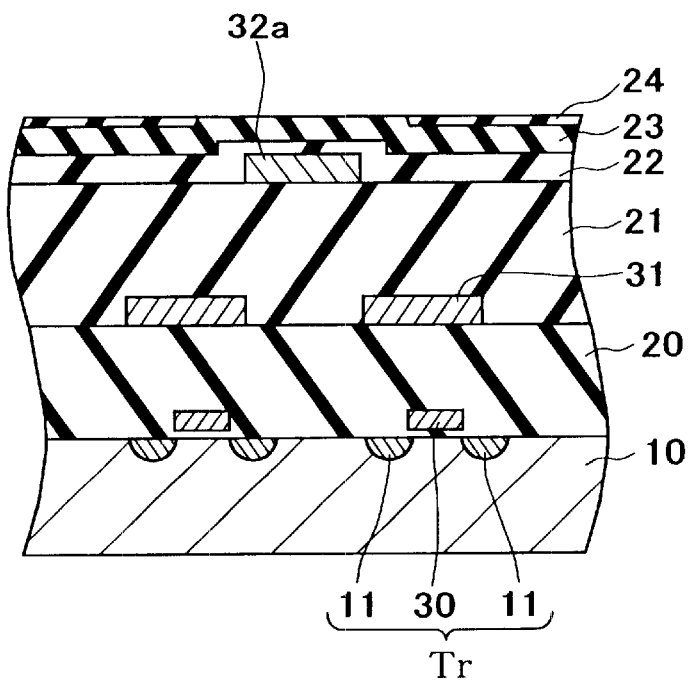
Figure 7B:
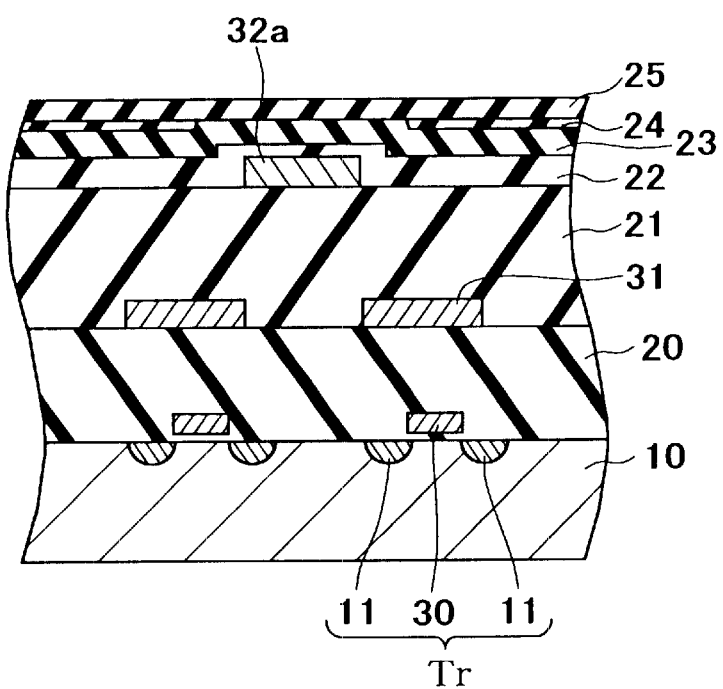

Below, an explanation will be made of an embodiment of a semiconductor device for surface-shape recognition of the present invention and the process for production of the same by referring to the drawings.

Figure 8:
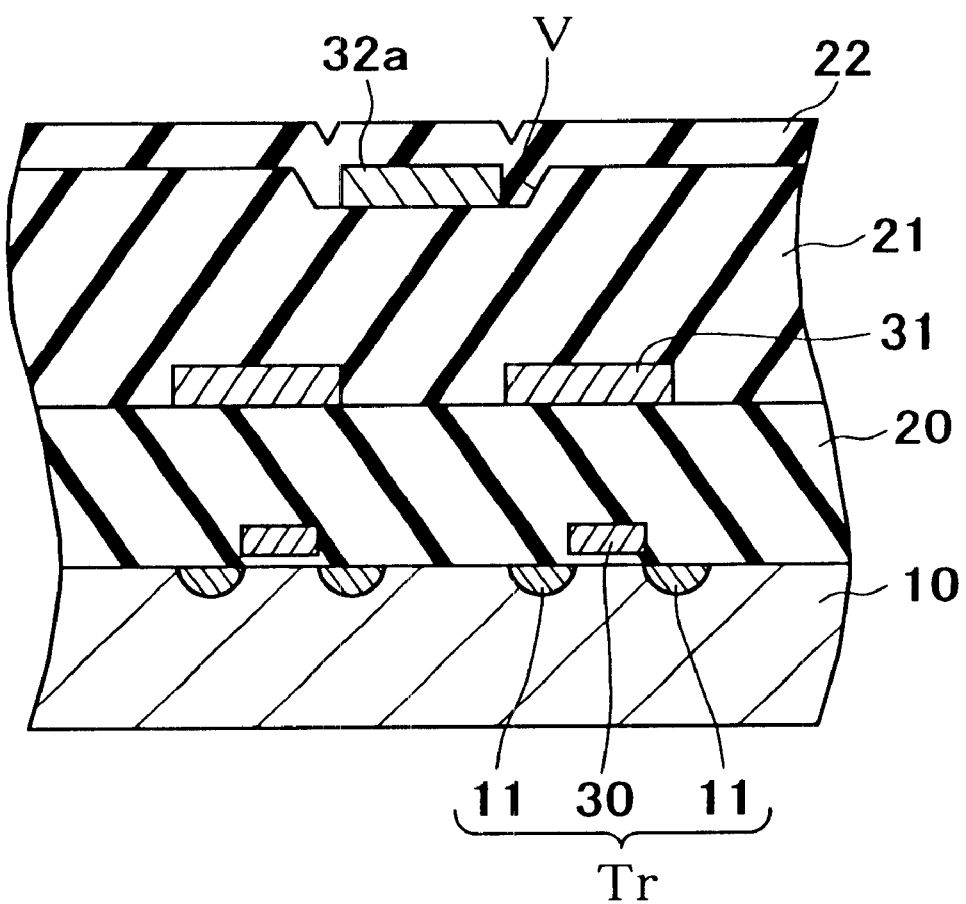
FIG. 8 is a sectional view of a semiconductor device for surface-shape recognition according to an embodiment of the present invention.

FIG. 8 is a sectional view of an electrostatic capacity type semiconductor device for surface-shape recognition according to the present embodiment.

A gate electrode 30 forming a word line is formed above a channel formation region of a semiconductor substrate 10 via a not illustrated gate insulating film. Further, source and drain diffusion layers 11 are formed in the semiconductor substrate 10 at the two side portions of the gate electrode 30, whereby the transistor Tr is formed. One source or drain diffusion layer 11 of the transistor is connected to a not illustrated bit line.

An inter-layer insulating film 20 made of for example silicon oxide is formed while covering the transistor Tr. Sensor pad electrodes 31 (first electrodes) each being formed by a laminate of a barrier metal layer made of for example Ti and an aluminum layer etc. are formed at the upper layer thereof while arranged in a matrix. This sensor pad electrode 31 is formed while connected to the other source or drain diffusion layer 11 of the transistor Tr formed at the lower layer thereof by a not illustrated contact etc.

The first protective film 21 of the insulator made of for example silicon nitride is formed over the entire surface while covering the sensor pad electrodes 31 and the clearances among the sensor pad electrodes 31. A groove V is formed in the surface of the first protective film 21 in the region between the sensor pad electrodes 31.

A neutralization electrode 32a (second electrode) made of for example Ti is formed buried in the groove V.

The neutralization electrode 32a is connected to a not illustrated neutralization electrode pad fixed at for example a ground potential (GND) and is fixed at the ground potential (GND). By fixing the neutralization electrode pad at the power supply potential, it is also possible to fix the neutralization electrode 32a at the power supply potential.

The second protective film 22 of the insulator made of for example silicon nitride is formed over the entire surface while covering the neutralization electrode 32a.

The semiconductor device for surface-shape recognition using the region wherein the sensor pad electrodes 31 are arranged in a matrix as the shape recognition surface is configured as described above.

Figure 9A:
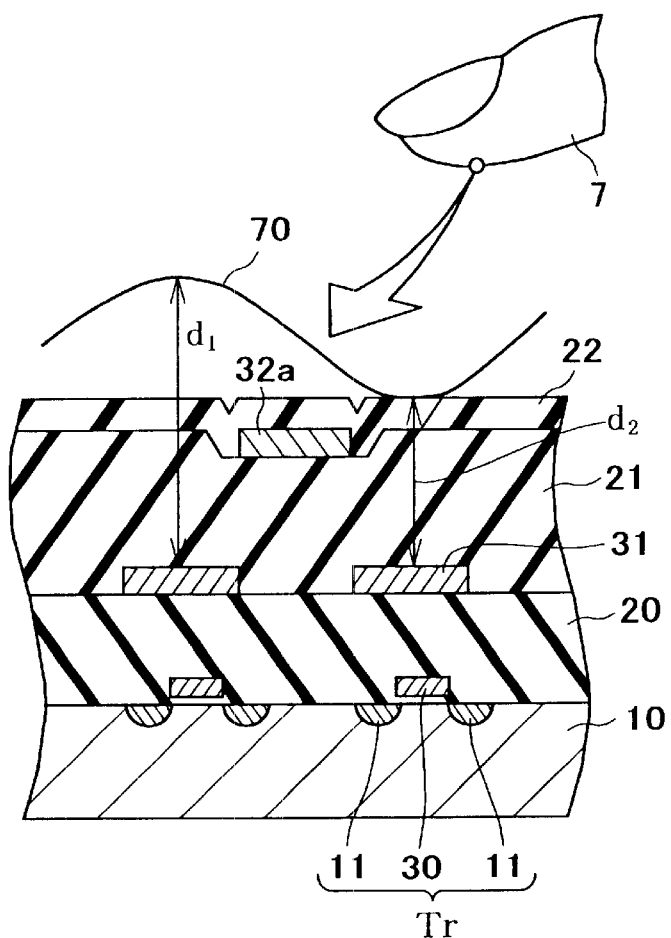
FIG. 9A is a sectional view for explaining the operation of recognizing the surface shape of an object in the semiconductor device for surface-shape recognition according to the embodiment of the present invention.

Next, an explanation will be made of the operation of the semiconductor device for surface-shape recognition according to the present embodiment. As shown in FIG. 9A, when for example a human finger 7 (object) touches the shape recognition surface of the semiconductor device for surface-shape recognition, capacitors are formed from the sensor pad electrode 31, the first protective film 21 and the second protective film 22, and the finger 7. The first protective film 21 and the second protective film 22 act as part of the capacitor insulating film.

In the above description, the distance d between each sensor pad electrode 31 and the finger 7 (for example d1, d2, . . . ) changes in accordance with the topology 70 of the fingerprint. Accordingly, there arises a difference in the capacitances of the capacitors formed by the sensor pad electrodes 31 arranged above the shape recognition surface in the matrix, therefore it has become possible to recognize the shape of the fingerprint or other object by reading and detecting the charges stored in the sensor pad electrodes 31 by a semiconductor element such as a transistor formed on the substrate 10.

Here, each sensor pad electrode 31 forms a unit cell of the shape recognition surface of the semiconductor device for surface-shape recognition.

The capacitors configured by the sensor pad electrodes 31 have distances d equal to ∞ in all unit cells of the shape recognition surface in the state where for example the finger 7 does not touch the shape recognition surface. Accordingly, the electrostatic capacity value $C_S$ becomes equal to 0 in all unit cells.

Figure 9B:
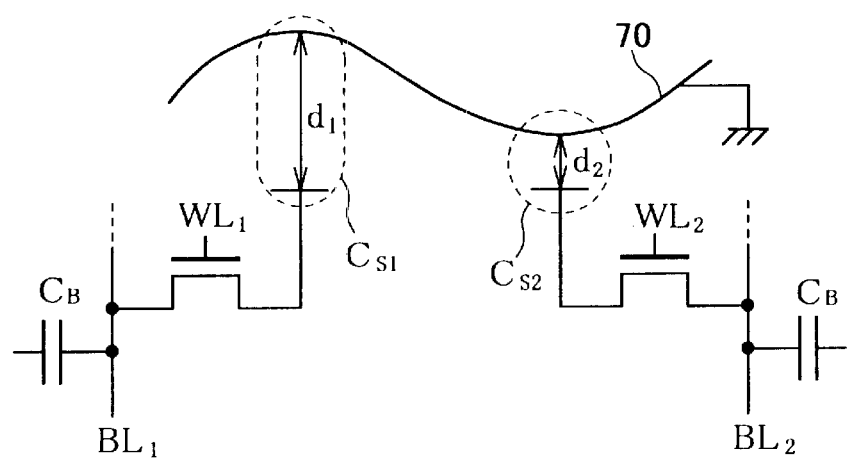
FIG. 9B is a circuit diagram of the semiconductor device for surface-shape recognition according to the embodiment of the present invention.

On the other hand, in the state where for example the finger 7 touches the shape recognition surface, as shown in FIG. 9B, in the n-th unit cell, capacitors of the electrostatic capacity value $C_{Sn}$ are formed from the sensor pad electrode 31, the first protective film 21 and the second protective film 22, and the finger 7. The electrostatic capacity value $C_{Sn}$ is represented by:

$$C_{Sn} = \epsilon \cdot \epsilon_0 \cdot S/d_n$$

Here, S is the area contributing to the capacitor of each electrode, $d_n$ is the distance between the electrode of the n-th unit cell and the finger (for example d1, d2, . . . ), and n is the number of each unit cell (n=1, 2, . . . )

As the configuration for reading the electrostatic capacity value $C_{Sn}$ in the unit cells, there is employed a configuration wherein the capacitors formed from the sensor pad electrode 31 of each unit cell, the first protective film 21 and the second protective film 22, and the finger 7 are connected to one source or drain diffusion layer 11 of the transistor using for example the word line WL (WL$_1$, WL$_2$, . . . ) as the gate electrode, the other source or drain diffusion layer 11 is connected to the bit line BL (BL$_1$, BL$_2$, . . . ), and further the capacitor of the electrostatic capacity value $C_B$ is connected to the bit line BL.

In the above configuration, by the touch of the finger in the state where $V_{CC}$ is applied to the bit line BL ($V_{CC}$ precharge), the potential change of the bit line BL represented by:

$$\Delta V_n = [C_{Sn}/(C_B + C_{Sn})] \cdot V_{CC}$$

occurs. By detecting this potential change $\Delta V_n$ in each cell, the electrostatic capacity value $C_{Sn}$ for every unit cell is calculated and image processing is carried out to detect for example a fingerprint.

By the semiconductor device for surface-shape recognition according to the embodiment of the present invention, the neutralization electrode 32a impressed with the fixed potential such as the ground potential or the power supply potential is formed in the groove V formed in the surface of the first protective film 21 in the region between the sensor pad electrodes 31. Therefore, even if static electricity is discharged when pressing by for example a finger, swift neutralization is performed by the neutralization electrode 32a, and thus electrostatic destruction can be prevented. Further, since the surface of the second protective film 22 serving as the shape recognition surface has become flat, the mechanical strength is improved and the occurrence of cracks in the shape recognition surface at the time of pressing by the finger or the like can be prevented, so the reliability of the device can be improved.

An explanation will be made next of a process of production of a semiconductor device for surface-shape recognition according to an embodiment of the present invention.

Figure 10A:
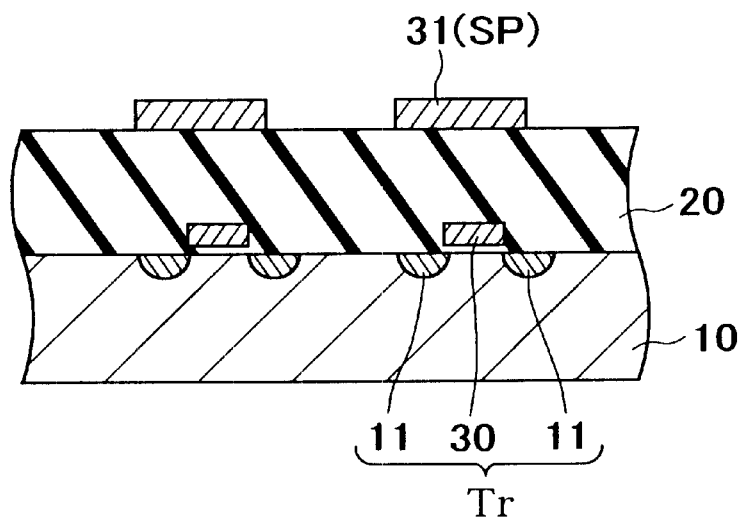

First, as shown in FIG. 10A, a not illustrated gate insulating film is formed on a channel formation region of the semiconductor substrate 10, and the gate electrode 30 forming the word line is formed above the gate insulating film. The source or drain diffusion layers 11 are formed in the semiconductor substrate 10 at the two side portions of the gate electrode 30 by for example ion implantation using the gate electrode 30 as the mask, and a not illustrated bit line is connected to one source or drain diffusion layer 11. Thus, the transistor Tr is formed. The transistor Tr can be formed by an ordinary method.

Next, by for example CVD, silicon oxide is deposited and an inter-layer insulating film 20 for covering the transistor Tr is formed.

Next, a not illustrated contact reaching the source or drain diffusion layer 11 is formed penetrating through the inter-layer insulating film 20, Ti or a laminate of for example Ti/TiN/Ti is grown by for example sputtering at the upper layer thereof so as to contact the contact. Further, aluminum or aluminum alloy such as aluminum silicide is deposited by sputtering, then patterning is carried out in a matrix to form the sensor pad electrodes 31 each being formed by a laminate of a barrier metal layer and aluminum layer or the like.

Figure 10B:
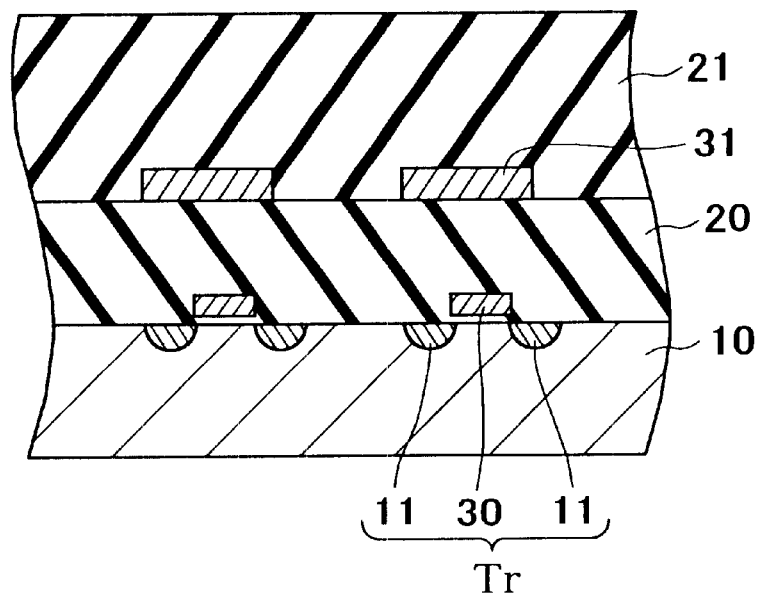

Next, as shown in FIG. 10B, by for example CVD, silicon nitride is deposited over the entire surface while covering the upper layers of the sensor pad electrodes 31 and the clearances between the sensor pad electrodes 31 to form the first protective film 21.

Figure 11A:
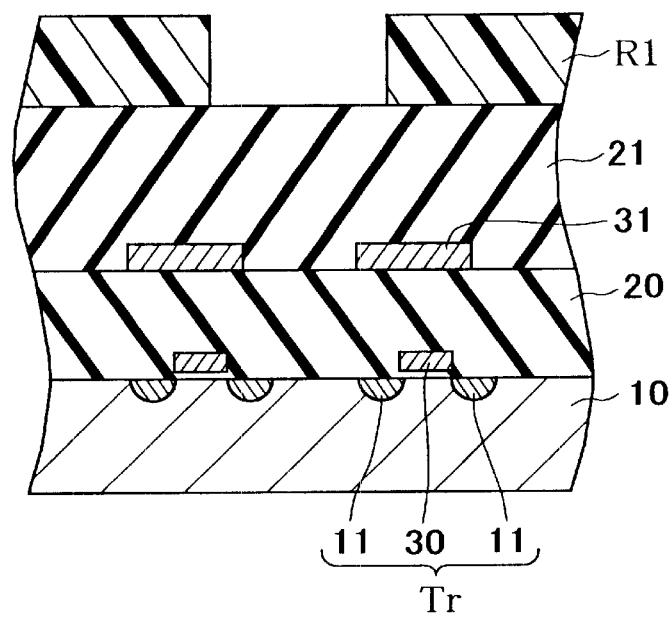
FIG. 11B shows the state up to the step of formation of a groove.

Next, as shown in FIG. 11A, the resist film R1 of the pattern for forming the groove for forming the neutralization electrode in the region between the sensor pad electrodes 31 is formed at the upper layer of the first protective film 21 by photolithography. At this time, desirably the pattern of the resist film R1 is made slightly broader than the width of the neutralization electrode to be formed later.

Figure 11B:
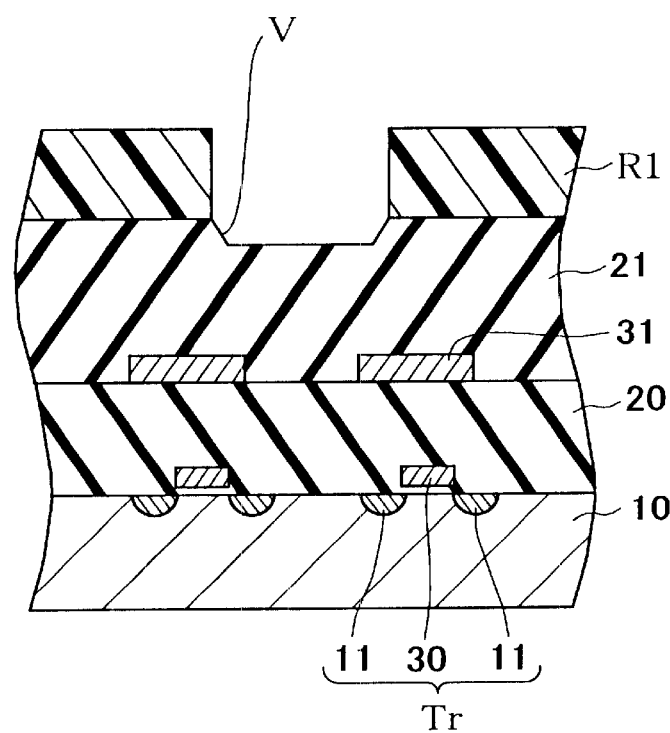

Next, as shown in FIG. 11B, the groove V is formed in the surface of the first protective film 21 by etching for example RIE by using the resist film R1 as a mask. At this time, desirably the depth of the groove V is set to the same degree as the thickness of the neutralization electrode to be formed later.

Figure 12A:
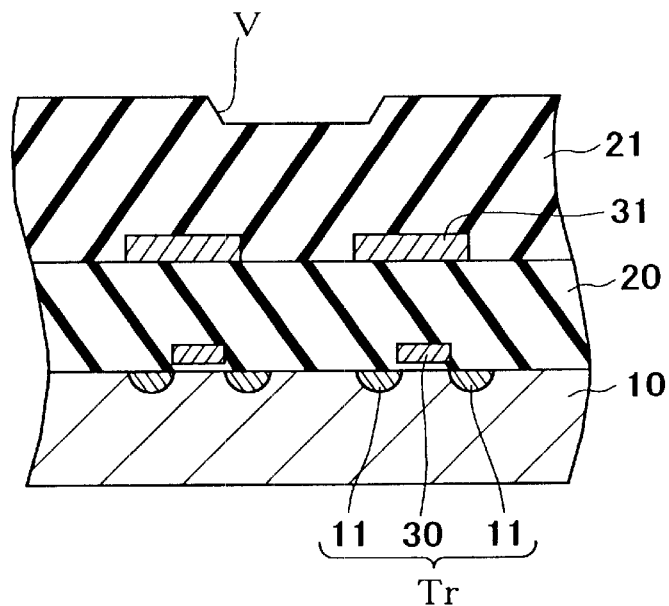

Next, as shown in FIG. 12A, the resist film R1 is removed by using for example an organic solvent.

Figure 12B:
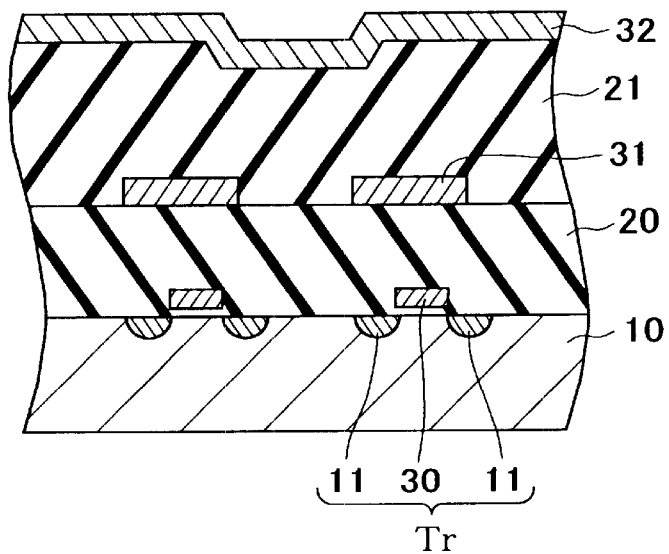

Next, as shown in FIG. 12B, a neutralization electrode layer 32 made of Ti or the like is formed above the first protective film 21 by for example sputtering.

Figure 13A:
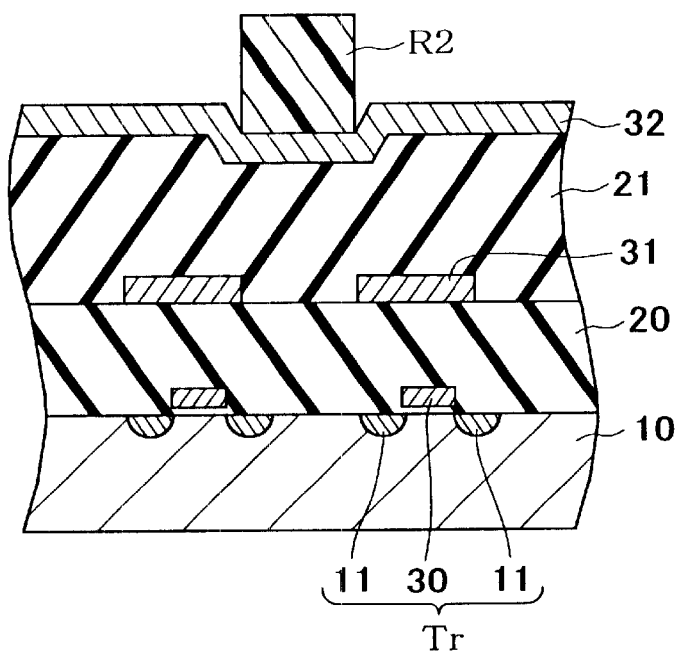

Next, as shown in FIG. 13A, a resist film R2 having a pattern for forming the neutralization electrode is formed at an upper layer of the neutralization electrode layer 32 by photolithography.

Figure 13B:
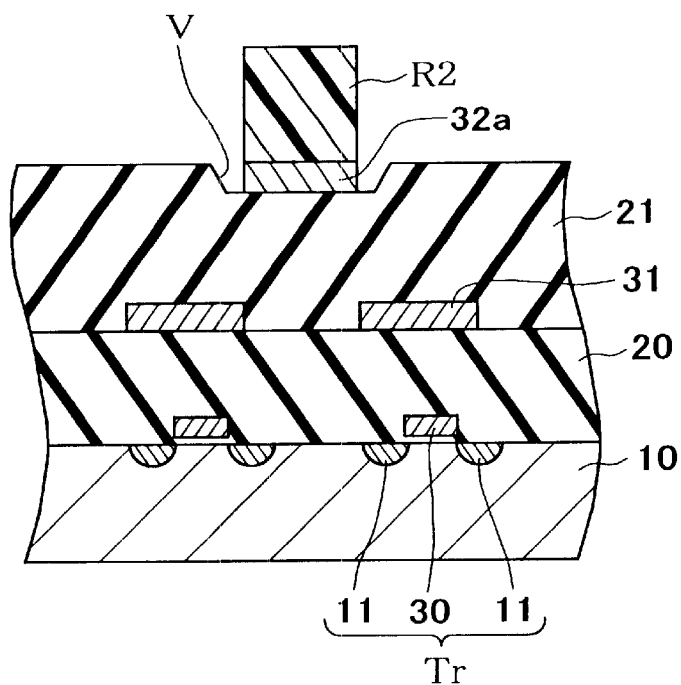

Next, as shown in FIG. 13B, the neutralization electrode layer 32 formed outside of the groove V is removed by etching, for example RIE, to form the neutralization electrode 32a.

Figure 14:
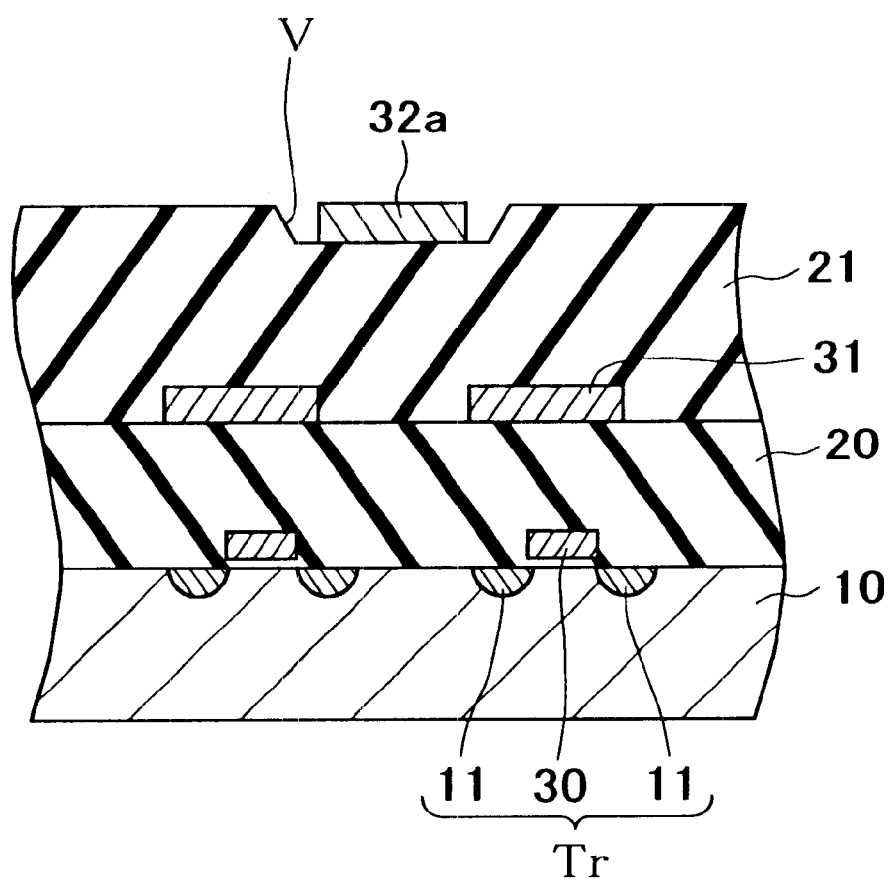
FIG. 14 shows steps continuing from FIG. 13B and shows the state up to the step of removal of the resist film of the pattern for forming a neutralization electrode.

Next, as shown in FIG. 14, the resist film R2 is removed by using for example an organic solvent.

Next, silicon nitride is deposited over the entire surface while covering the first protective film 21 and the neutralization electrode 32a by for example CVD, the second protective film 22 is formed, and thus the semiconductor device for surface-shape recognition shown in FIG. 8 is reached.

The semiconductor device for surface-shape recognition can be fixed onto a die pad of for example a lead frame, wire bonded, and sealed while leaving the surface shape recognition surface exposed to obtain the semiconductor device for surface-shape recognition having an intended form.

According to the process of production of the semiconductor device for surface-shape recognition according to the embodiment of the present invention, when forming the neutralization electrode 32a, the groove V is formed in the surface of the first protective film 21 and the neutralization electrode 32a is formed in the groove V, therefore the surface of the second protective film 22 after the formation of the neutralization electrode 32a can be flattened.

Further, according to the process of production of the semiconductor device for surface-shape recognition according to the embodiment of the present invention, the step of forming the groove V in the surface of the first protective film 21 and forming the neutralization electrode 32a in the related groove V can achieve the flattening of the second protective film 22 by preventing the increase of the steps by the usually used systems.

The semiconductor device for surface-shape recognition and the process of production of the same of the present invention are not limited to the above embodiments.

For example, as the circuit for reading the charges stored in the sensor pad electrodes of the unit cells, use can be made of circuits other than the circuits having the configuration explained in the above embodiment.

Further, the neutralization electrode may be fixed at any potential other than the ground potential or the power supply potential so far as it is a constant potential.

Further, the first and second protective film may preferably be made of different materials such as silicon nitride and silicon oxide.

Various modifications are possible within the range not out of the gist of the present invention in addition to the above description.

Summarizing the effects of the present invention, according to the semiconductor device for surface-shape recognition of the present invention, since the second electrode impressed with the fixed potential is formed in the groove formed in the surface of the first protective film, swift neutralization is achieved by the second electrode even if static electricity is discharged at the time of pressing by the object, and electrostatic destruction can be prevented.

Further, since the surface of the second protective film serving as the shape recognition surface is flat, the mechanical strength is improved and the occurrence of the cracks of the shape recognition surface at the time of pressing by the object can be prevented.

According to the process of production of the semiconductor device for surface-shape recognition of the present invention, the surface of the second protective film after the formation of the second electrode can be flattened.

Further, according to the process of production of the semiconductor device for surface-shape recognition, the step of forming the groove in the surface of the first protective film and forming the second electrode in the related groove can achieve the flattening of the second protective film by a small number of steps by preventing the increase of the steps by the usually used systems.

What is claimed is:

1. A semiconductor device for surface-shape recognition comprising:

a first transistor formed on a substrate;

a first electrode formed on the first transistor;

a first protective film formed on said first electrode; and a second electrode formed on said first protective film;

said second electrode being formed in a groove formed in said first protective film.

2. A semiconductor device for surface-shape recognition as set forth in claim 1, wherein the thickness of said second electrode is substantially the same as the depth of said groove.

3. A semiconductor device for surface-shape recognition as set forth in claim 1, further comprising a second protective film formed on said second electrode.

4. A semiconductor device for surface-shape recognition as set forth in claim 3, wherein said first protective film and said second protective film are made of different materials.

5. A semiconductor device for surface-shape recognition as set forth in claim 1, wherein said second electrode is fixed to a certain potential.

6. A semiconductor device for surface-shape recognition as set forth in claim 1, wherein said first electrode is arranged in a matrix.

7. A semiconductor device for surface-shape recognition as set forth in claim 1, wherein said first transistor is a field effect transistor and the source or drain of said transistor is connected to said first electrode.

8. A semiconductor device for surface-shape recognition comprising:

first and second transistors formed on a substrate;

first and second electrodes formed on said first and second transistors;

a first protective film formed on said first and second electrodes; and a third electrode formed on said first protective film;

said third electrode being formed in a groove formed in said first protective film.

9. A semiconductor device for surface-shape recognition as set forth in claim 8, wherein the thickness of said third electrode is substantially the same as the depth of said groove.

10. A semiconductor device for surface-shape recognition as set forth in claim 8, further comprising a second protective film formed on said third electrode.

11. A semiconductor device for surface-shape recognition as set forth in claim 10, wherein said first protective film and said second protective film are made of different materials.

12. A semiconductor device for surface-shape recognition as set forth in claim 8, wherein said third electrode is fixed to a certain potential.

13. A semiconductor device for surface-shape recognition as set forth in claim 8, wherein said first and second electrodes are field effect transistors, the source or drain of said first transistor is connected to said first electrode, and the source or drain of said second transistor is connected to said second electrode.

14. A semiconductor device for surface-shape recognition as set forth in claim 13, wherein the terminals which are not connected to the first and second electrodes of said first and second transistors are connected to capacitors.

15. A semiconductor device for sensing a surface-shape, comprising:

- a first transistor formed on a substrate;
- a first electrode formed on the first transistor;
- a first protective film formed on said first electrode;
- a second electrode formed in a groove formed in said first protective film; and
- a sensing surface;
- to thereby form a capacitor between said first electrode and an object when said object touches on said sensing surface, a capacitance of said capacitor being defined in response to a shape of said object, and to provide said capacitance to outside.

16. A semiconductor device for sensing a surface-shape, comprising:

- first and second transistors formed on a substrate;
- first and second electrodes formed on said first and second transistors;
- a first protective film formed on said first and second electrodes;
- a third electrode formed in a groove formed in said first protective film; and
- a sensing surface;
- to thereby form a first capacitor between said first electrode and an object and a second capacitor between said second electrode and said object when said object touches on said sensing surface, capacitances of said first and second capacitors being defined in response to a shape of said object, and to provide said capacitances to outside.

* * * * *